US007516676B2

(12) United States Patent
Gao

(10) Patent No.: US 7,516,676 B2
(45) Date of Patent: Apr. 14, 2009

(54) TORQUE LIMITING AND RATCHETING MECHANISM HAVING AN INTERNAL CAM

(75) Inventor: Hua Gao, Fox Point, WI (US)

(73) Assignee: Bradshaw Medical, Inc., Kenosha, WI (US)

( * ) Notice: Subject to any disclaimer, the term of this patent is extended or adjusted under 35 U.S.C. 154(b) by 52 days.

(21) Appl. No.: 11/803,279

(22) Filed: May 14, 2007

(65) Prior Publication Data

US 2007/0289419 A1 Dec. 20, 2007

Related U.S. Application Data

(63) Continuation-in-part of application No. 11/471,065, filed on Jun. 20, 2006, now Pat. No. 7,343,824.

(51) Int. Cl.
*G01F 1/66* (2006.01)

(52) U.S. Cl. ................................ 73/862.21; 73/862.23

(58) Field of Classification Search .................. 73/847, 73/862.08, 862.23, 862.21; 81/58, 467, 473, 81/847

See application file for complete search history.

(56) References Cited

U.S. PATENT DOCUMENTS 1,860,871 A * 5/1932 Pouliot ........................ 81/480
2,332,971 A * 10/1943 Johnson ....................... 81/480
2,802,354 A * 8/1957 Bohnhoff et al. .............. 464/36
3,168,944 A * 2/1965 Zimmerman ............. 192/56.53
3,277,670 A * 10/1966 Bent ....................... 192/56.62
3,277,671 A * 10/1966 Francis et al. ................. 464/36
3,305,058 A * 2/1967 Barclay et al. ........... 192/56.57
3,613,751 A * 10/1971 Juhasz ......................... 81/474
3,653,226 A * 4/1972 Westbury .................. 192/18 R
3,702,546 A * 11/1972 Schnepel ..................... 464/36
3,942,337 A * 3/1976 Leonard et al. ............... 464/36
4,041,729 A * 8/1977 Bilz .......................... 192/56.5
4,653,359 A * 3/1987 Liao ............................ 81/475
4,668,206 A * 5/1987 Fukumoto .................... 464/36
4,712,456 A * 12/1987 Yuan ........................... 81/473
5,035,311 A * 7/1991 Girguis .................... 192/56.57
5,054,588 A * 10/1991 Thorp et al. ................ 477/178
5,129,293 A * 7/1992 Larson et al. ................. 81/483
5,156,244 A * 10/1992 Pyles et al. ................. 477/178
5,356,350 A * 10/1994 Schreiber .................... 475/153
5,383,818 A * 1/1995 Lessat-Kaupat et al. ....... 464/36
5,505,676 A * 4/1996 Bookshar .................... 477/178
5,983,635 A * 11/1999 Kato et al. .................... 60/487
6,132,435 A * 10/2000 Young ........................ 606/104
6,640,674 B1 * 11/2003 Rinner et al. ................. 81/475
6,990,877 B1 * 1/2006 Wu ............................. 81/467
7,032,476 B2 * 4/2006 Lin ............................ 81/58.3
7,114,824 B2 * 10/2006 Picone ....................... 362/119
7,243,581 B1 * 7/2007 Gao ............................ 81/473
7,284,451 B2 * 10/2007 Cupif et al. ............. 73/862.23

(Continued)

*Primary Examiner*—Harshad Patel
*Assistant Examiner*—Freddie Kirkland, III
(74) *Attorney, Agent, or Firm*—Ryajn Kromholz & Manion S.C.

(57) ABSTRACT

A torque limiting and ratcheting driver having a housing and a torque limiting assembly located within the housing. The torque limiting assembly includes a cam member, a plunger, and a roller supported by the plunger that interacts with the cam member. The ratcheting assembly is located interiorly of the cam member.

17 Claims, 5 Drawing Sheets

U.S. PATENT DOCUMENTS

| | | | | |
|---|---|---|---|---|
| 7,334,509 | B1 * | 2/2008 | Gao | 81/475 |
| 7,343,824 | B2 * | 3/2008 | Gao | 73/862.21 |
| 7,389,700 | B2 * | 6/2008 | Gao | 73/862.21 |
| 2007/0084313 | A1 * | 4/2007 | Gao et al. | 81/62 |
| 2007/0101831 | A1 * | 5/2007 | Rinner et al. | 81/58.4 |
| 2007/0289391 | A1 * | 12/2007 | Gao | 73/862.21 |
| 2007/0289420 | A1 * | 12/2007 | Gao | 81/474 |
| 2008/0087146 | A1 * | 4/2008 | Gao | 81/474 |
| 2008/0087515 | A1 * | 4/2008 | Gao | 192/48.1 |
| 2008/0105060 | A1 * | 5/2008 | Gao | 73/862.21 |

* cited by examiner

TORQUE LIMITING AND RATCHETING MECHANISM HAVING AN INTERNAL CAM

RELATED APPLICATION

The present application is a continuation-in-part application of application, U.S. Ser. No. 11/471,065, filed on 20 Jun. 2006 now U.S. Ser. No. 7,343,824.

BACKGROUND OF THE INVENTION

The present invention relates to tools that limit the amount of torque delivered by the tool and, specifically, tools that limit the amount of torque and incorporate a ratcheting mechanism into the tool. Most specifically, the present invention relates to torque limiting and ratcheting tools that are used for in medical procedures.

Many mechanical devices are used to deliver a large amount of torque to a screw, bolt, nut, or other similar device or object. Even though there is a large amount of torque being delivered, in many situations, it is still desirous to control the precise amount of torque being delivered. For instance, too much torque may strip the object that is being driven, which would lead to the driven object becoming ineffective, such as a stripped bolt or screw. This is especially important in medical operations and procedures, where precision is critical, such as when working with spinal and skeletal structures and related devices. Thus, drivers have been developed to limit the amount of torque delivered to the driven object or device.

Devices that deliver a limited amount of torque are generally mechanically limited in other precise functions that may be carried out with the device. For example, devices that limit the amount of torque delivered by the device and also incorporate ratcheting arrangements have limited precision. Because the individual components of the torque assembly are interacting with the components of the ratcheting portion of the tool, precision is less than ideal for both of these functions, especially after repeated uses of the device.

SUMMARY OF THE INVENTION

The present invention provides a torque limiting driver that also includes a ratcheting mechanism. The driver generally comprises a housing that holds a torque assembly, which generally comprises a plunger that interacts with a cam member. The cam member is arranged to receive a ratcheting assembly, which is adapted to be matingly received within the interior of the cam member. This provides a precise design for the ratcheting assembly, whereby the various components of the ratcheting assembly are housed within the cam member. The cam member acts as a housing for the ratcheting assembly, which further contributes to the precision of the ratcheting assembly.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
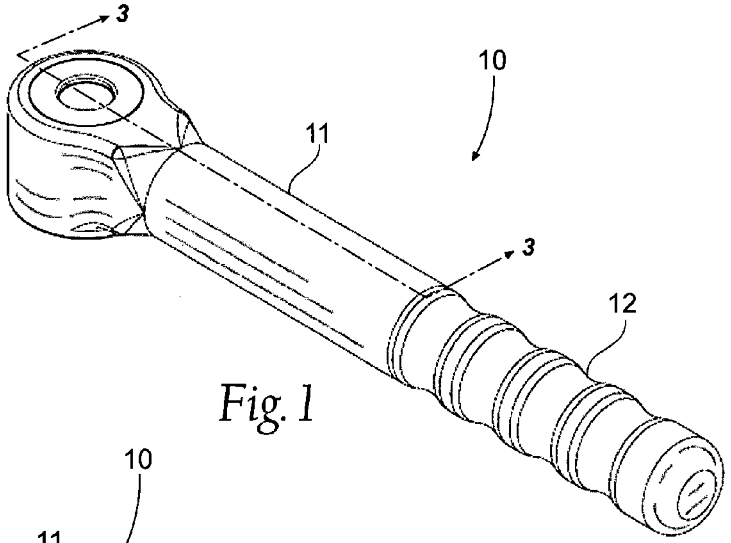
FIG. 1 is a perspective view of a torque limiting mechanism according to the present invention.

FIG. 1 provides a perspective view of a torque limiting and ratcheting device 10. The device 10 is preferably designed to provide ratcheting action in a singular direction. The ratcheting device 10 generally comprises a housing 11 and a lever or handle portion 12. As will be shown more clearly with the following figures and description, the device 10 has an improved design wherein the active parts of the specific ratcheting mechanism are located internally of a cam member used in the present invention. The arrangement provides for precise ratcheting and torque-limiting assemblies within the same device, without either of the assemblies necessarily being required to interact with one another.

Figure 2:
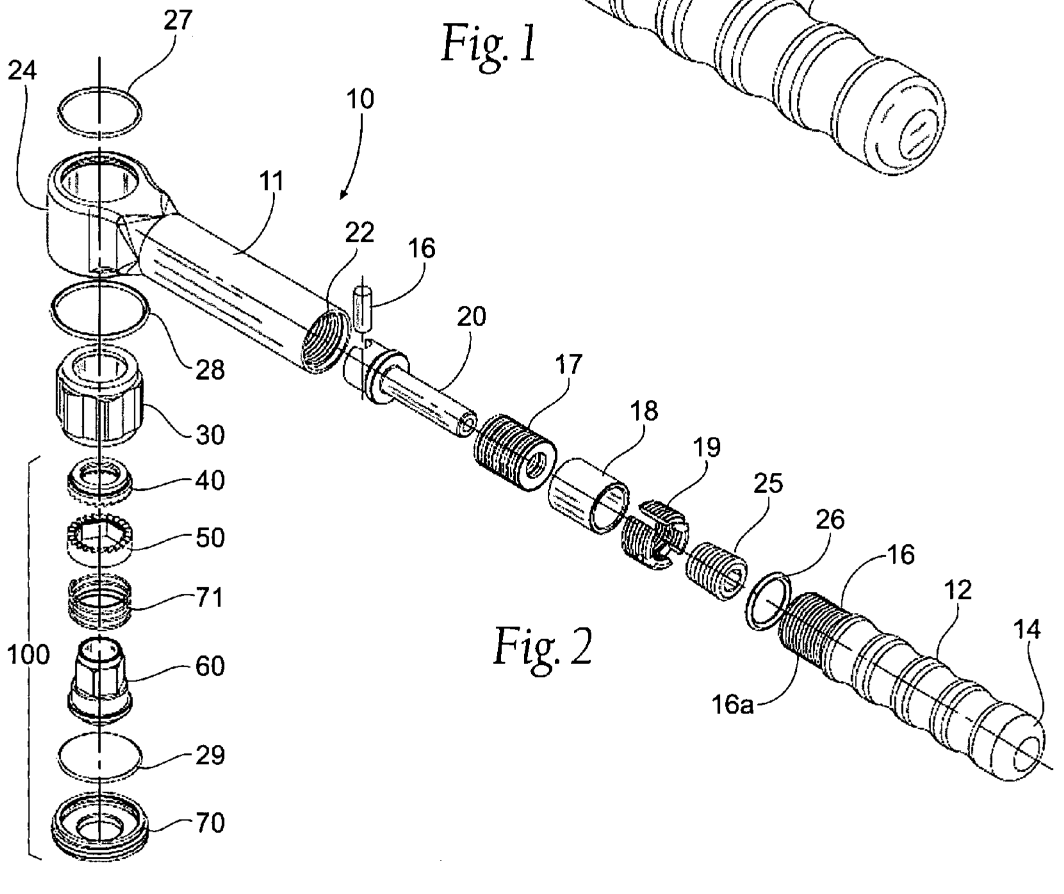
FIG. 2 is an exploded view of the torque limiting mechanism shown in FIG. 1.

FIG. 2 provides an exploded view of the ratcheting device 10 shown in FIG. 1. The handle portion 12 has a first end 14 and a second end 16, with the second end 16 having a threaded portion **16*a*. The housing 11 has a first end 22 and a second end 24. The first end 22 is arranged to mate with the threaded portion 16*a* of the handle portion 16, while the second end 24 houses a cam member 30**.

Figure 4:
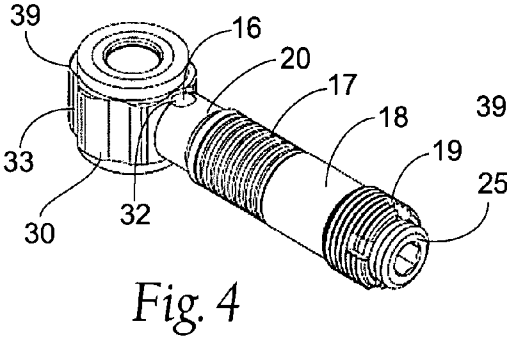
FIG. 4 is a perspective view of a cam arrangement used in accordance with present invention.

Still referring to FIG. 2, the housing 11 contains a plunger 20 that interacts with the cam member 30 to provide the necessary torque-limiting arrangement of the present invention. As will be more clearly demonstrated with respect to FIGS. 4-6, the plunger 20 receives and holds a roller 16 that will interact with the surface of the cam member 30. The plunger 20 supports a spring 17, a spacer 18, and an adjusting and locking screw 19. A plug screw 25 will be inserted into the locking screw 19 to further secure and adjust the various elements supported by the plunger 20, with an O-ring 26 providing sealing means when the handle portion 12 is threaded onto the housing 11.

The cam mechanism 30 is also secured within the housing 11 by way of an end screw 70, with O-rings 27, 28 and 29 providing sealing means for the cam member 30 when secured within the housing 11. The cam mechanism 30 houses a ratcheting assembly 100, also referred to as a clutch assembly. The ratcheting assembly 100 comprises a first gear 40 and a second gear 50 that are arranged to interact with one another. The first gear 40 will generally be considered as the drive gear, while the second gear 50 will generally be referred to as the ratcheting gear. The gears 40, 50 are properly biased upon a drive shaft 60 by way of a compression spring 71.

Figure 3:
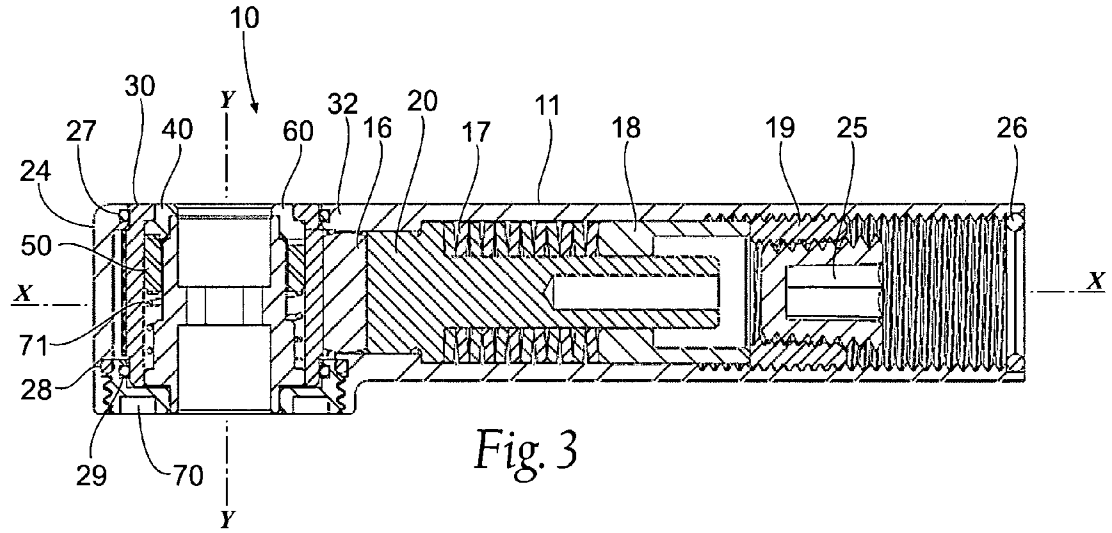
FIG. 3 is a cross-sectional view of the torque limiting mechanism of FIG. 1 taken along the line 3-3 of FIG. 1.

Referring now to FIG. 3, a cross-sectional view of the ratcheting device 10 shows the various interacting elements of the present invention being situated within the housing 11. The cam mechanism 30 sits within the second end 24 of the housing 11, arranged to hold the roller member 16 between the plunger 20 and the cam member 30. The plunger 20 has a cutout area 32 (see FIGS. 4 and 6) for receiving the roller member 16, but the plunger 20 and the roller member 16 could be designed as a single device. Similarly, the roller member 30 could consist of another shaped member, such as a ball bearing or other shaped object. The spring 17 generally provides biasing means for the plunger 20 against the handle portion 12, with the spacer 18 and the screws 19 and 25 ensuring the spring 17 provides the necessary biasing means for the plunger 20 and the roller member 16 to interact with the cam member 30. The plunger 20 and the cam member 30 are preferably axially aligned along an axis X, with the roller member 16 being perpendicularly situated with respect to the cam member 30 and the plunger 20. Such an arrangement allows an efficient delivery of torque from the handle 12 to an object, such as a drill bit or similar object, (not shown) being driven by the ratcheting device 10.

FIG. 3 also shows the ratcheting assembly 100 interiorly located within the cam member 30. The ratcheting assembly 100, comprising the gears 40 and 50, is fittingly positioned interiorly of the cam member 30 so that the outer surfaces of the gears 40, 50 are in generally frictional contact with the inner surface of the cam member 30. The gears 40, 50 are positioned upon a drive shaft 60, with the gear 50 preferably being arranged in a fitting relationship with the surface of the drive shaft 60. That is, an inner surface 51 of the gear 50 will fittingly mate with a surface 61 of the drive shaft 60 (see FIGS. 10 and 11). The drive shaft is secured within the cam member 30 with the end screw 70 being threaded onto the bottom of the housing 30. The ratcheting assembly 100 is properly positioned and biased within the cam member 30 with the assistance of the spring 71. The cam member 30 and the ratcheting assembly 100 are preferably centrally and coaxially aligned along an axis Y, which is preferably perpendicular to the axis X. The alignment of the cam member 30 and the ratcheting assembly 100 minimizes unnecessary competing forces and resistance between one another that may result if the cam member 30 and the ratcheting assembly 100 were not properly aligned. That is, an axially aligned arrangement of the cam member 30 and the ratcheting assembly 100 minimizes competing transitional forces when torque is delivered by a user. Overall wear on the device 10 is minimized, which allows for a more precise overall mechanism 10.

Figure 5:
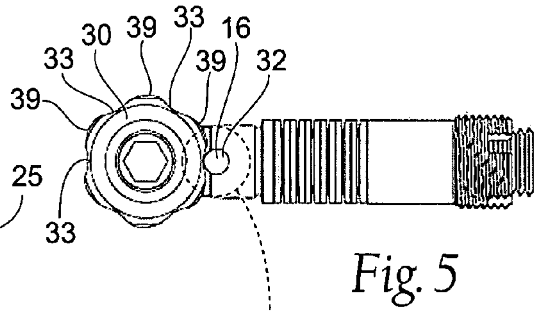
FIG. 5 is an overhead view of the cam arrangement of FIG. 4.
Figure 6:
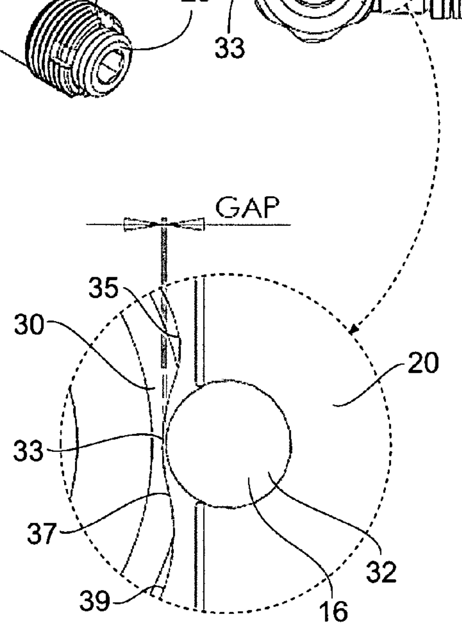
FIG. 6 is a close-up view of the area detailed with a dotted line in FIG. 5, showing the interaction of a cam member and a plunger.
Figure 7:
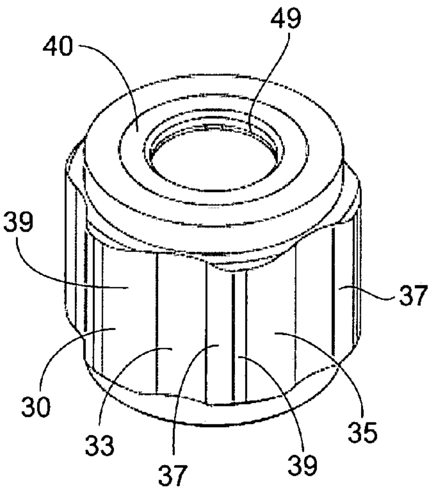
FIG. 7 is a perspective view of an individual cam member according to the present invention.

FIGS. 4 through 7 demonstrate the arrangement and interaction of the plunger 20 and the cam member 30. As noted, the roller member 16 rests between the curvilinear surface of the cam member 30 and the cutout area 32 of the plunger 20. The plunger 20 and the roller member 16 are properly positioned with the help of the spring 17 and the spacer 18, which are supported by the plunger 20. The locking screw 19 and the plug screw 25 further properly position and tension the plunger 20 within the housing (see FIG. 3). The curvilinear surface of the cam member 30 comprises a plurality of inclined areas 33 interposed between gradual sloped areas 35 and 37 that culminate in elevated areas 39. When torque is not being applied to the device 10, the rolling member 16 is situated generally within the inclined areas 33. As shown in FIG. 6, a gap is situated between the rolling member 16 and a respective inclined area 33. This free gap minimizes potential damage on the roller member 16 as it moves from an override position to an engaged position. The device 10 is operable without a gap between the roller member 16 and the cam member 30, but is preferable over a completely abutting or touching arrangement to increase the life of the device 10. Likewise, other plunger/cam arrangements are possible, provided that the ratcheting mechanism is located interiorly of the cam member. When the rolling member is in this first position or override position, the device applies no torque to an object that is being driven by the device 10. When torque is applied to the device 10, the rolling member 16 will come into contact with the surface of the sloped areas 35 and 37, thereby providing torque for the cam member 30. Once a maximum amount of torques is reached, the rolling member 16 will reach one of the elevated areas 39, whereby the rolling member 16 will roll into an adjacent inclined area 33. The cam member 30 can be designed with as many inclined areas 33 and elevated areas 39 as desired, provided that the cam member 30 and the plunger 20 are capable of delivering torque in an arrangement as shown and described.

Figure 8:
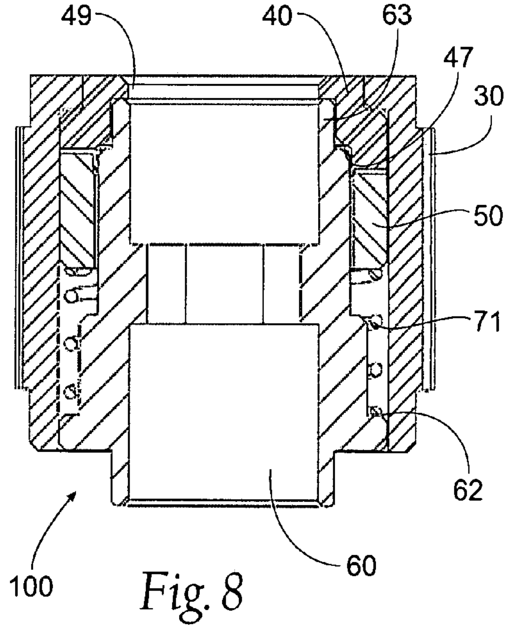
FIG. 8 is a cross-sectional view of a cam member according to the present invention.

FIG. 8 provides a cross-sectional view of the cam member 30, with the ratcheting assembly 100 located interiorly of the cam member 30. As noted above, such a combination is unique compared to previously known ratcheting mechanisms and torque limiting drivers. The drive gear 40 and the ratcheting gear 50 are positioned to interact with one another within the interior of the cam member 30, separately from interactions of the cam member 30 and the plunger 20 (FIG. 5). However, the gear 40 can potentially be secured to the cam member 30 by welding or other similar means, or possibly can be designed as a single piece with the cam member 30. The spring 71 provides biasing means for the assembly as the gears 40 and 50 are positioned upon the shaft 60.

Figure 9:
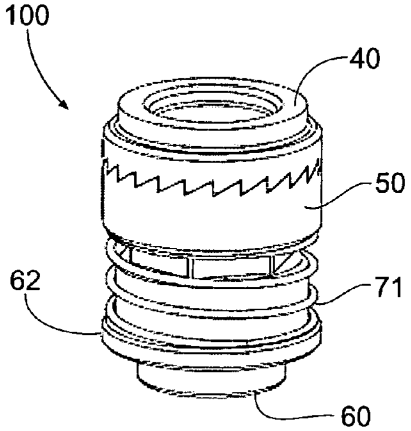
FIG. 9 is a perspective view of a gear arrangement located internally of the cam member shown in FIG. 8.
Figure 10:
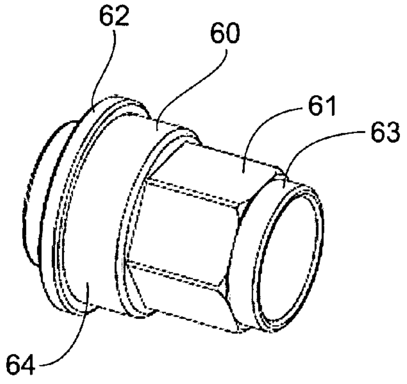
FIG. 10 is a perspective view of a drive shaft used in connection with the gear arrangement of FIG. 9.

As is shown in FIGS. 8 and 9, the spring 71 sits upon a lip 62 of the shaft 60 and biases the ratcheting gear 50 against the shaft 60 and also the gear 40. As FIG. 10 shows, the shaft 60 has a first section 61 and a second section 64. The first section 61 has a hexagonal shape that can mate with an inner surface 51 of the ratcheting gear 50 (see FIG. 11). The second section 64 preferably has a cylindrically shaped surface that can mate with and receive the spring 71.

Figure 11:
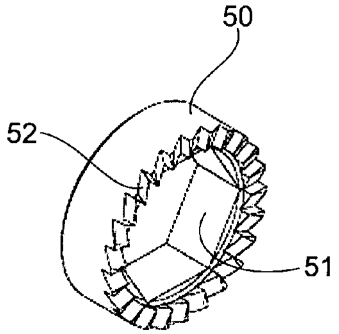
FIG. 11 is a perspective view of an individual gear used within the arrangement shown in FIG. 9.

FIG. 11 provides a perspective view of the ratcheting gear 50. The ratcheting gear 50 has an outer surface having a cylindrical shape to frictionally mate with the interior surface of the cam member 30. The outer surface of the ratcheting gear 50 and the inner surface of the cam member 30 could be designed with different arrangements and still fall within the scope of the invention. The cylindrical shapes allows the gear 50 and the cam member 30 to be in an easy sliding arrangement with one another, with a minimum of unnecessary force between each other, while still providing a secure relationship between the gear 50 and the cam member 30. As stated above with respect to FIG. 10, the inner surface 51 has a hexagonal shape to releasably mate with the hexagonal first section 61 of the shaft 60. The gear 50 comprises a plurality of teeth 52 that will interact and mesh with a plurality of teeth 41 located on the gear 40.

Figure 12:
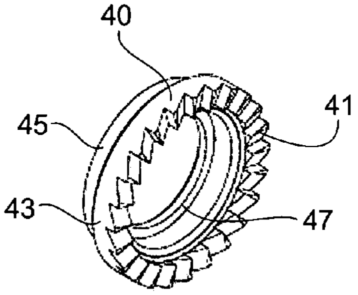
FIG. 12 is a second gear arranged to mate with the gear shown in FIG. 11.

A perspective view of the gear 40 is shown in FIG. 12. The teeth 41 of the gear 40 will mesh with the teeth 52 on the gear 50. The gear 40 further comprises a first section 43 and a second section 45. The first section 43 has a wider diameter than the second section 45, which allows for an interior shelf 47 to be formed where the two sections meet. The first section 43 will sliding nestle upon a third section 63 of the shaft 60

(see FIG. 7), with the shelf 47 resting upon the first section 61 of the shaft 60. The resultant arrangement is shown in FIG. 9.

The ratcheting assembly 100 is designed to fit tightly within the interior of the cam member 30. As shown in FIG. 8, the second section 45 of the gear 40 fits securely within an opening 49 located on the top of the cam member 30. As previously stated, the ratcheting gear 40 and the cam member 30 could be designed as a single piece, but it is preferable for them to be individual pieces and fixed together.

Figure 13:
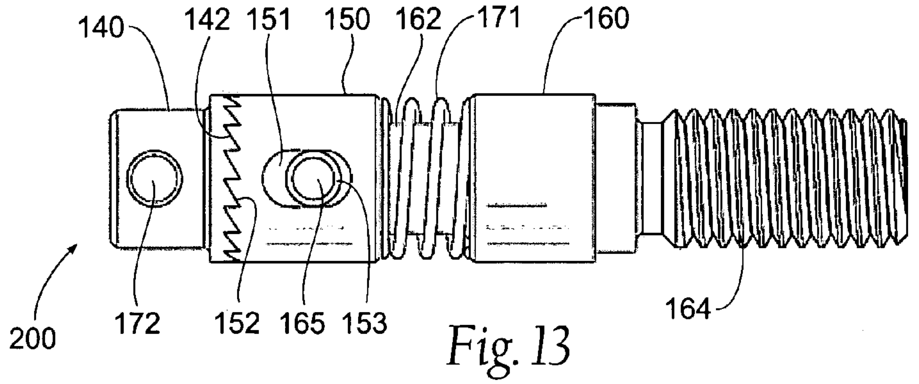
FIGS. 13-15 provide an alternate gear arrangement according to the present invention.
Figure 14:
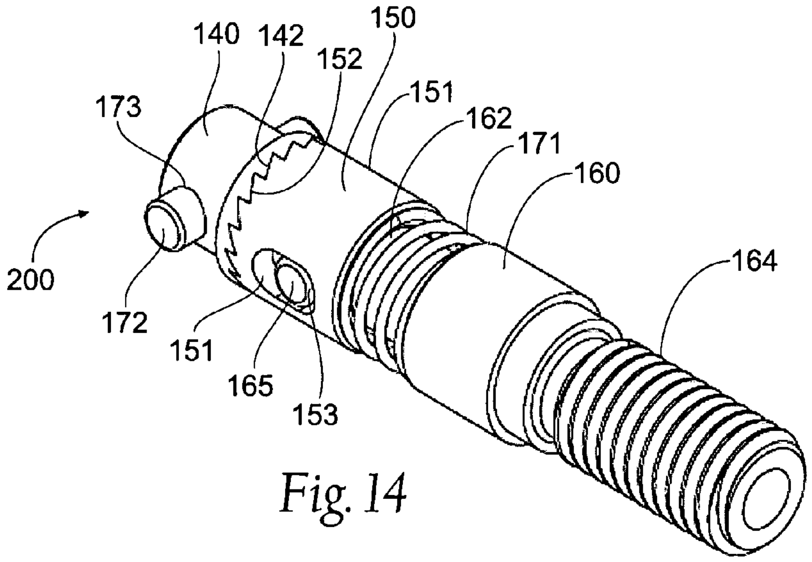
Figure 15:
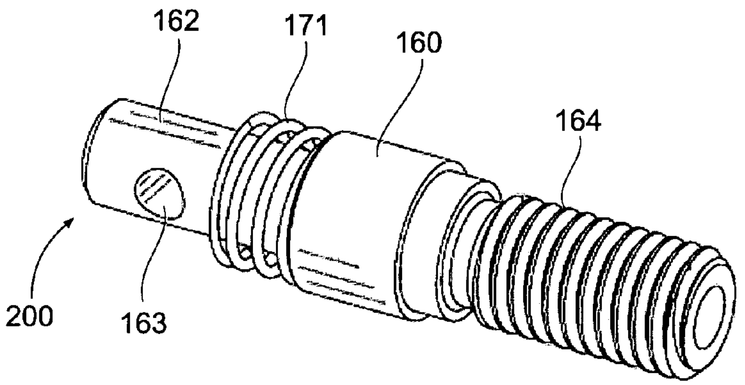

FIGS. 13-15 provide an alternate embodiment of a ratcheting assembly 200 according to the present invention. The ratcheting assembly 200 will function and be arranged similarly as the ratcheting assembly 100. That is, the ratcheting assembly 200 is arranged and configured so that it will be secured interiorly within a cam member. The ratcheting assembly 200 generally comprises a first drive gear 140 and a second ratcheting gear 150. The gears 140, 150 sit upon a shaft 160. The shaft 160 has a first portion 162 that supports a spring 171, which provides biasing means for the gears 140, 150. The shaft 160 also comprises a threaded portion 164 that is designed to receive a tool or similar device (not shown).

The drive gear 140 has a throughbore 173 (FIG. 15) that is arranged to receive a pin 172. As will be shown and discussed in FIG. 16, the pin 172 will be inserted within a cam member 130 to fittingly secure the ratcheting assembly 200 within the cam member 130. The drive gear 140 has a toothed or serrated surface 142 that interacts with a toothed or serrated surface 152 located on the ratcheting gear 150. A pair of oppositely disposed slots 151 located on the ratcheting gear 150 assists in providing the necessary movement for the gear 150 to insure a ratcheting arrangement. The slots 151 house a drive pin 165 that allows for the ratcheting gear 150 to be slidingly connected to the drive shaft 160. Preferably a pair of opposed wheel members 153 are positioned on the drive pin 165 within the slots 151 so that the drive pin 165 will easily slide within the slots 151. As is shown in FIG. 15, the drive shaft 160 has an opening 163 that is sized to receive the drive pin 165. The drive pin 165 is inserted through the opening 163 and sits within the slots 151, which provides latitudinal movement limitations for the ratcheting gear 150 with respect to the drive gear 140. The shaft 160 has a cylindrical outer surface 162 that is sized to receive the ratcheting gear 150.

Figure 16:
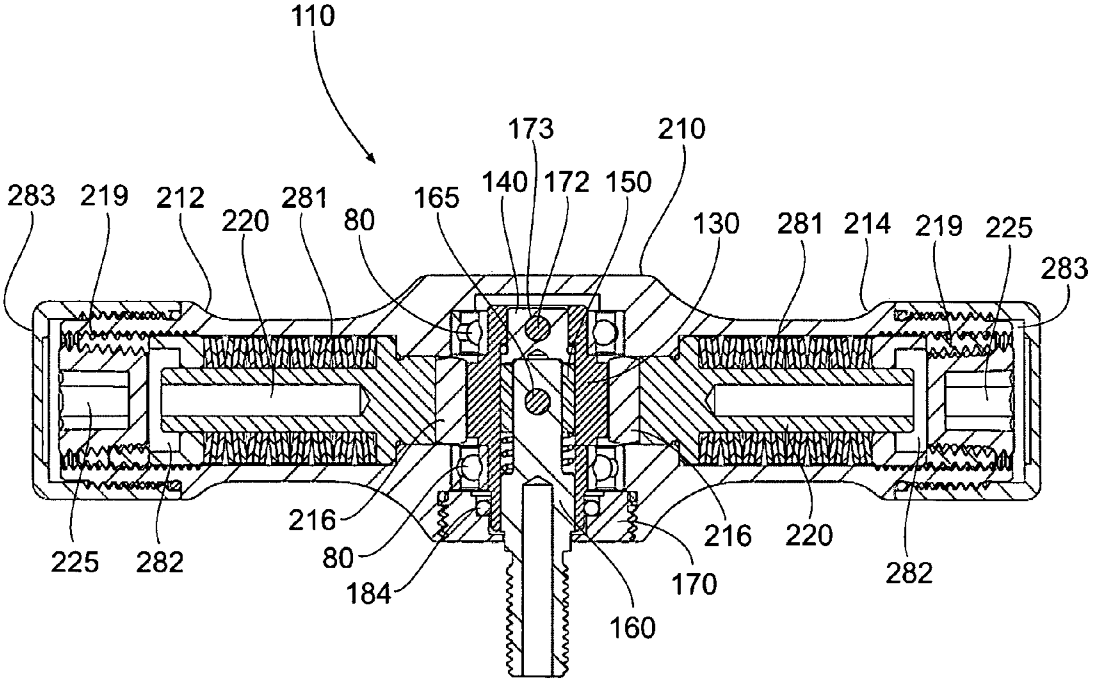
FIG. 16 is a cross-sectional view of an alternate handle incorporating the cam arrangement of the present invention.

FIG. 16 shows the cam member 130 and the ratcheting assembly 200 located within a torque limiting driver 110. The driver 110 has the ability to limit torque delivery at multiple settings and levels. Such a driver 110 has been described and shown in co-pending application, U.S. Ser. No. 11/471,065, incorporated herein by reference. The driver 110 comprises a housing 210, which has a first section 212 and a second section 214. The sections 212, 214 are generally similar in shape and arrangement, with each section 212, 214 housing a plunger 220 that is biased against the housing 210 by way of springs 281. The plungers 220 are preferably laterally spaced from one another and are axially aligned with the cam member 130. The proper positioning of the springs 281 is assisted by way of spacers 282 and plug screws 225, and adjusting screws 219, similarly to the relationship shown in the previous embodiment (see FIG. 2). A pair of respective caps 283 secures the various elements within the housing 210 within a respective section 212, 214 of the housing 210, providing the necessary spacing for the plungers 220 and the cam member 130.

Still referring to FIG. 16, the plungers 220 interact with the cam member 130 to provide the necessary torque limiting arrangement for the driver 110. A respective roller member 216 sits between each of the plungers 220 and the cam member 130. The arrangement and positioning of the roller members 216 between the plungers 220 and the cam member 130 is designed similar to that of the previous embodiment, discussed and shown with respect to FIGS. 4-6. That is, the roller members 216 are positioned with a free gap located between the roller member and the cam member 130 in a normal operating arrangement. As discussed previously, the free gap contributes to the precision of the driver 110, as the amount of damaging force on the roller members 216 when the cam member 130 and the plungers 220 move from an engaged position to a resting or override position is minimized. The roller members 216 can be designed as integral with the plungers 220, or can be situated as separate elements from the plungers 220.

Referring further to FIG. 16, the cam member 130 is situated within the housing 110, with a plurality of bearing members, such as ball bearings 80, being positioned between the wall of the housing 110 and the cam member 130. The gears 140, 150 sit within the interior of the cam member 130, being supported by the shaft 160. The shaft 160 is held in place inside of the cam member 130 by way of a stop screw 170 that is threaded onto the housing 110. An O-ring 184 is positioned between the stop screw 170 and the shaft 160 to act as a gasket for the ratcheting assembly 200. The ratcheting assembly 200 is coupled to the cam member 130 by way of the pin 172, which allows the gear 140 to be fittingly secured to the housing 110. The pin 173 slidingly secures the gear 150 to the shaft 160, and is biased against the gear 140 by way of the spring 171 (see FIG. 13). The arrangement provides an efficient and secure ratcheting assembly 200 that will not interfere with the torque-limiting arrangement of the cam member 130 and the plungers 220.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A torque limiting and ratcheting driver, said driver comprising:

- a housing;
- a cam member located in said housing, said cam member having a curvilinear surface, said cam member being movable between an engaged position and an override position;
- a plunger member located in said housing;
- means for biasing said plunger against said housing;
- a rolling member located between said plunger member and said cam member, said rolling member being in contact with said cam member when said cam member is in said engaged position, said rolling member and said cam member forming a gap therebetween when said cam member is in said override position; and
- a ratcheting assembly located interiorly of said cam member.

2. The driver according to claim 1 wherein said ratcheting assembly further comprises:

- a drive shaft;
- a first gear supported by said drive shaft, said first gear having an engageable surface;
- a second gear supported by said drive shaft, said second gear having an engageable surface arranged to interact with the engageable surface of said first gear; and
- means for biasing said first gear and said second gear towards one another.

3. The driver according to claim 2 wherein one of said gears is fittingly and removingly supported by said drive shaft.

4. The driver according to claim 2 wherein said engageable surfaces of said first and said second gear comprise serrated surfaces.

5. The driver according to claim 2 wherein said biasing means comprises a spring supported by said drive shaft.

6. The driver according to claim 1 wherein said cam member has an interior surface, said ratcheting assembly frictionally positioned against said interior surface of said cam member.

7. A torque limiting and ratcheting driver comprising:

a housing;

a torque limiting assembly located within said housing, said torque limiting assembly comprising;

a cam member;

a plunger; and a rolling member supported by said plunger, said rolling member arranged to interact with said cam member;

a ratcheting assembly located interiorly of said cam member;

a drive shaft;

a first gear supported by said drive shaft, said first gear having an engageable surface;

a second gear supported by said drive shaft, said second gear having an engageable surface arranged to interact with the engageable surface of said first gear; and means for biasing said first gear and said second gear towards one another.

8. The driver according to claim 7 wherein said engageable surfaces of said first gear and said second gear further comprises serrated surfaces.

9. The driver according to claim 7 wherein said cam member has an interior surface, said ratcheting assembly frictionally positioned against said interior surface of said cam member.

10. The driver according to claim 7 wherein one of said first and said second gear being frictionally positioned against an interior surface of said cam member, the other of said gear members fittingly and removably secured to said drive shaft.

11. A combination torque-limiting and ratcheting driver, said driver comprising:

a housing;

a torque limiting assembly located within said housing, said torque limiting assembly comprising;

a cam member;

a plunger biased against said housing; and a rolling member supported by said plunger, said rolling member arranged to interact with said cam member;

a ratcheting assembly located interiorly of said cam member, a second plunger located in said housing, said second plunger laterally spaced apart from said first plunger; and a second rolling member supported by said second plunger, said second rolling member being arranged to interact with said cam member.

12. The driver according to claim 11 wherein said ratcheting mechanism further comprises:

a drive shaft;

a first gear supported by said drive shaft, said first gear having an engageable surface;

a second gear supported by said drive shaft, said second gear having an engageable surface arranged to interact with the engageable surface of the said first gear; and means for biasing said first gear and said second gear towards one another.

13. The driver according to claim 11 wherein said cam member has an interior surface, said ratcheting assembly frictionally positioned against said interior surface of said cam member.

14. A combination torque-limiting and ratcheting driver, said driver comprising:

a housing:

a torque limiting assembly located within said housing, said torque limiting assembly comprising;

a cam member;

a plunger biased against said housing;

a rolling member supported by said plunger, said rolling member arranged to interact with said cam member; and a ratcheting assembly located interiorly of said cam member, a drive shaft;

a first gear supported by said drive shaft, said first gear having an engageable surface;

a second gear supported by said drive shaft, said second gear having an engageable surface arranged to interact with the engageable surface of said first gear; and means for biasing said first gear and said second gear towards one another.

15. The driver according to claim 14 wherein said ratcheting assembly of said drive shaft comprises an opening, wherein one of said first and said second gears comprises a pair of opposing slots, said ratcheting assembly further comprising a pin, said pin intersecting said opening and being housed within said slots.

16. The driver according to claim 14 wherein said ratcheting assembly further comprises a pin inserted through a throughbore located on one of said gears, said pin providing means for securing said ratcheting assembly within said cam member.

17. A combination torque-limiting and ratcheting driver, said driver comprising:

a housing;

a torque limiting assembly located within said housing, said torque limiting assembly comprising;

a cam member;

a plunger biased against said housing; and a rolling member supported by said plunger, said rolling member arranged to interact with said cam member;

a ratcheting assembly located interiorly of said cam member, said rolling member is in contact with said cam member when said cam member is in an engaged position, said rolling member and said cam member forming a gap therebetween when said cam member is in an override position.

* * * * *